US008571052B2

(12) United States Patent
Carlson et al.

(10) Patent No.: US 8,571,052 B2
(45) Date of Patent: Oct. 29, 2013

(54) DETERMINING THE CONFIGURATION OF AN ETHERNET FABRIC

(75) Inventors: Scott M. Carlson, Tucson, AZ (US);
Daniel G. Eisenhauer, Austin, TX (US);
Roger G. Hathorn, Tucson, AZ (US);
Jeffrey W. Palm, Rochester, MN (US);
Sandy K. Kao, Austin, TX (US);
Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/257,467

(22) Filed: Oct. 24, 2008

(65) Prior Publication Data

US 2010/0103939 A1   Apr. 29, 2010

(51) Int. Cl.
*H04L 12/28* (2006.01)
*H04L 12/56* (2011.01)
*H04J 3/16* (2006.01)
*H04J 3/22* (2006.01)
*G06F 15/16* (2006.01)

(52) U.S. Cl.
USPC ............ 370/419; 370/395; 370/466; 709/228

(58) Field of Classification Search
USPC .................. 370/245–252, 351–404, 419–422;
709/217–229, 242–249
See application file for complete search history.

(56) References Cited

U.S. PATENT DOCUMENTS 7,307,995 B1 * 12/2007 Iyer et al. ................. 370/395.32
7,564,869 B2 * 7/2009 Cafiero et al. ................. 370/466
2006/0251067 A1 * 11/2006 DeSanti et al. ............... 370/389
2008/0159260 A1 * 7/2008 Vobbilisetty et al. ......... 370/351
2009/0034522 A1 * 2/2009 Hayes et al. .................. 370/389
2009/0041046 A1 * 2/2009 Hirata .......................... 370/402
2009/0052461 A1 * 2/2009 Brown et al. ................. 370/401
2009/0245791 A1 * 10/2009 Thaler et al. ................... 398/45
2009/0252181 A1 * 10/2009 Desanti ......................... 370/474
2009/0254677 A1 * 10/2009 Desanti ......................... 709/242
2009/0292813 A1 * 11/2009 Snively et al. ................ 709/228
2010/0150174 A1 * 6/2010 Bhide et al. ................... 370/474

OTHER PUBLICATIONS

INCITS; FCoE Commentary; EMC/HP/IBM; T11/07-408v1; Jul. 13, 2007; pp. 1-26.
IBM; FCoE: Ethernet Direct-Attached Fabrics (EDAF); T11/07-608v0; Oct. 10, 2007; pp. 1-11.

* cited by examiner

*Primary Examiner* — M. Phan
(74) *Attorney, Agent, or Firm* — James L. Baudino; Matthew B. Talpis (57) ABSTRACT

A Fibre Channel over Ethernet (FCoE) device obtains knowledge of the configuration of an attached Ethernet fabric during a fabric initialization or login (FLOGI) process. FCoE N_Ports obtain similar information during the port initialization or login (PLOGI) process. The FCoE device may provide network management services to attached FCoE devices. Embodiments include a management module or processor within an FCoE N_Port. The management module or processor receives information associated with an Ethernet fabric from the FCoE N_Ports and provides management services based on the information associated with the Ethernet fabric. The FCoE N_Port communicatively couples to at least one additional FCoE N_Port through the Ethernet fabric. The FCoE N_Ports may be implemented within a disc storage drive, a host bus adapter, and/or an FCoE switch. The capability of an N_Port to obtain this information allows a management module or processor at the N_Port to manage the Ethernet fabric.

17 Claims, 8 Drawing Sheets

| Bit Word | 31 ... 24 | 23 ... 16 | 15 ... 08 | 07 ... 00 |
|---|---|---|---|---|
| 0 | Reserved | | Enet Flags 702 | Enet Switch Count 704 |
| 1 | Enet Switch IP Address List Data Length 706 | | | |
| 2 to 63 | Enet Switch IP Address List 708 | | | |

DETERMINING THE CONFIGURATION OF AN ETHERNET FABRIC

CROSS-REFERENCE TO RELATED APPLICATIONS

The present U.S. Utility Patent Application claims priority pursuant to 35 U.S.C. §120 to the following U.S. Utility Patent Application which is hereby incorporated herein by reference in its entirety and made part of the present U.S. Utility Patent Application for all purposes:

1. U.S. Utility application Ser. No. 12/257,488 entitled "FIBRE CHANNEL FRAMING AND SIGNALING OPTIONAL HEADER FOR ETHERNET FABRIC CONFIGURATION INFORMATION," filed Oct. 24, 2008, pending.

BACKGROUND OF THE INVENTION

The present invention relates generally to storage networks and devices, and more particularly to Fibre Channel over Ethernet (FCoE) Devices.

Fibre Channel (FC) is a high speed network protocol primarily used for storage networking (i.e. coupling servers and storage devices). FC is standardized by an InterNational Committee for Information Technology Standards (INCITS) and has become a standard connection type for storage area networks (SAN). Despite common connotations of its name, FC signaling can run on both twisted pair copper wire and fiber-optic cables. The FC Protocol (FCP) refers to an upper layer interface protocol of SCSI type commands that supports scalable interconnect systems.

Fibre Channel over Ethernet (FCoE) is a standard protocol developed by INCITS T11 that maps FC natively over Ethernet.

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

According to one embodiment of the present invention a Fibre Channel over Ethernet (FCoE) system is provided. Embodiments may include a management module or processor within an FCoE Network Port (N_Port). This port may also be known as a Node port (e.g. host or storage device). The FCoE system includes at least one FCoE N_Port, an Ethernet fabric, and an FCoE switch. At least one FCoE N_Port communicatively couple to the FCoE switch through the Ethernet fabric. The FCoE N_Ports obtain the information associated with the Ethernet fabric during the fabric login (FLOGI) initialization process. Note that the information is not "exchanged" with the FCoE switch—the switch provides the information: the N_Port obtains the information via FLOGI. The information may later be exchanged between N_Ports at port login (PLOGI). The combination of the FCoE switch and the FCoE N_Port may provide network management services based on the information exchanged and associated with the Ethernet fabric.

Another embodiment provides a method of providing network management services within a Fibre Channel (FC) system. This involves initializing at least one FCoE N_Port. The initialized FCoE N_Port may be coupled to an Ethernet fabric. The FCoE N_Port may determine information associated with the Ethernet fabric. An FCoE switch couples to the FCoE N_Ports through the Ethernet fabric. Information associated with the Ethernet fabric is exchanged between the FCoE N_Port and the FCoE switch. This enables network management services to be provided based on information associated with the Ethernet fabric.

Yet another embodiment provides a FC system in accordance with embodiments of the present invention. This FC system includes a first FCoE N_Port, an Ethernet fabric, at least one additional FCoE N_Port and a management module or processor located within the combination of the FCoE N_Ports. The first FCoE N_Port couples to additional FCoE N_Ports through the Ethernet fabric. The FCoE N_Ports may determine information associated with the Ethernet fabric and exchange this information with the management module or processor. The management module or processor may then provide network management services based on the information associated with the Ethernet fabric. This may include fault isolation with limiting of the number of devices or FCoE N_Ports to be coupled to the Ethernet fabric.

BRIEF DESCRIPTION OF THE SEVERAL VIEWS OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGs., like numerals being used to refer to like and corresponding parts of the various drawings.

Embodiments of the present invention provide Fibre Channel over Ethernet (FCoE) devices that obtain knowledge of the configuration of an attached Ethernet fabric during a fabric initialization or login (FLOGI) process. FCoE N_Port obtains similar information during the port initialization or login (PLOGI) process. The FCoE device may provide network management services to attached FCoE devices. Embodiments include a management module or processor within an FCoE N_Port. The management module or processor receives information associated with an Ethernet fabric from the FCoE N_Ports and provides management services based on the information associated with the Ethernet fabric. The FCoE N_Port communicatively couples to at least one additional FCoE N_Port through the Ethernet fabric. The FCoE N_Ports may be implemented within a host or storage device, disc storage drive and a host bus adapter. The capability of an N_Port to obtain this information allows a management module or processor at the N_Port to manage the Ethernet fabric.

Fibre Channel (FC) is a high speed network protocol primarily used for storage networking (i.e. coupling servers and storage devices). The FC Protocol (FCP) is an FC-4 protocol that supports scalable interconnect systems. FC includes of the following protocol layers: (1) FC-0—The interface to the physical media; (2) FC-1—The encoding and decoding of data and out-of-band physical link control information for transmission over the physical media; (3) FC-2—The transfer of frames, sequences and Exchanges comprising protocol information units; (4) FC-3—Common Services required for advanced features such as striping, hunt group and multicast; and (4) FC-4—Application interfaces that can execute over FC such as the FC protocol for SCSI (FCP). Embodiments of the present invention relate to functions that may be implemented as part of the FCP. For example, FLOGI and PLOGI are FC-2 type functions used by all FC-4 protocols (e.g. single byte command code set SB-3 and FCP).

Unlike a layered network architecture, a FC network is largely specified by functional elements and the interfaces between them. These include, in part, the following: (1) N_Ports—The end points for fibre channel traffic; (2) FC Devices—The fibre channel devices to which the N_Ports provide access; (3) Fabric Ports—The interfaces within a fibre channel network that provide attachment for an N_Port.; (4) The network infrastructure for carrying frame traffic between N_Ports; and (5) within a switched or mixed fabric, a set of auxiliary servers, including a name server for device discovery and network address resolution.

FC systems are assembled from switches, storage systems, storage devices, host devices, servers or hosts, and other known devices. An FCoE switch is a network switch compatible with the FC protocol. FCoE switches allow the creation of a FC fabric that includes an Ethernet fabric, within a storage area network (SAN). The fabric is a network of FC switches, FCoE switches, switches and other FC devices. Switches may be deployed one at a time or in larger multi-switch configurations. SAN administrators typically add new switches as their server and storage needs grow, connecting switches together via fibre optic cable using standard device ports.

The Ethernet fabric in turn provides connectivity to an FCoE switch. N_Ports that can determine the presence of a direct-attached Ethernet fabric and the configuration of the fabric (e.g., number of switches, IP addresses of the switches) currently have no way of conveying this information to another N_Port. Embodiments of the present invention allow network management services located at an N_Port node to have configuration information of the Ethernet fabrics attached to other N_Ports. Currently N_Ports are without knowledge of the presence and configuration of Ethernet fabrics attached to other N_Ports, management module or processors have a limited view of the network configuration, and can provide only limited management services. By having each N_Port provide information regarding a direct-attached Ethernet fabric at N_Port login (PLOGI), an FCoE N_Port node can provide more comprehensive management services and fault isolation for the FC and Ethernet fabrics.

In embodiments of the present invention an FCoE Port (such as but not limited to an N_Port) may attach directly to an Ethernet fabric which in turn provides connectivity to an FCoE switch. The FCoE Ports are operable to determine the presence of a direct-attached Ethernet fabric and the configuration of the fabric (e.g., number of switches, IP addresses of the switches) and convey this information to another FCoE Port. A management module or processor operable to provide network management services is located at an FCoE node or switch. However, without knowledge of the presence and configuration of Ethernet fabrics attached to other FCoE Ports, the management module or processor providing management services has a limited view of the network configuration and can provide only limited management services. By having FCoE Ports provide information using the optional Ethernet header regarding a direct-attached Ethernet fabric at initialization (i.e. N_Port login (PLOGI), or alternatively on a periodic basis, the management module or processor can provide more comprehensive management services and fault isolation for the FC systems and Ethernet fabrics. For example, for performance, reliability, security or other reasons, it may be desirable to limit the number of Ethernet switches the management module or processor will allow in a direct-attached fabric at another FCoE Port. By providing this information to the at N_Port login, the N_Port initialization process can be aborted by the management module or processor if the number of switches in the direct-attached fabric at the other N_Port exceeds the maximum allowable value.

Embodiments of the present invention provide an FCoE N_Port that obtains knowledge of the configuration of a direct-attached Ethernet fabric (as obtained via another mechanism, such as fabric login (FLOGI)) and other FCoE N_Ports via port login (PLOGI). FCoE N_Ports will send the following information in each FLOGI or PLOGI/PDSIC ELS request and response payload: (1) an indication of whether an Ethernet fabric is present between the FCoE switch and the N_Port; (2) if an Ethernet fabric is present, a count of the number Ethernet switches in the fabric, and (3) optionally, a list of the IP addresses (IPv4 or IPv6) for each of the Ethernet switches.

Figure 1:
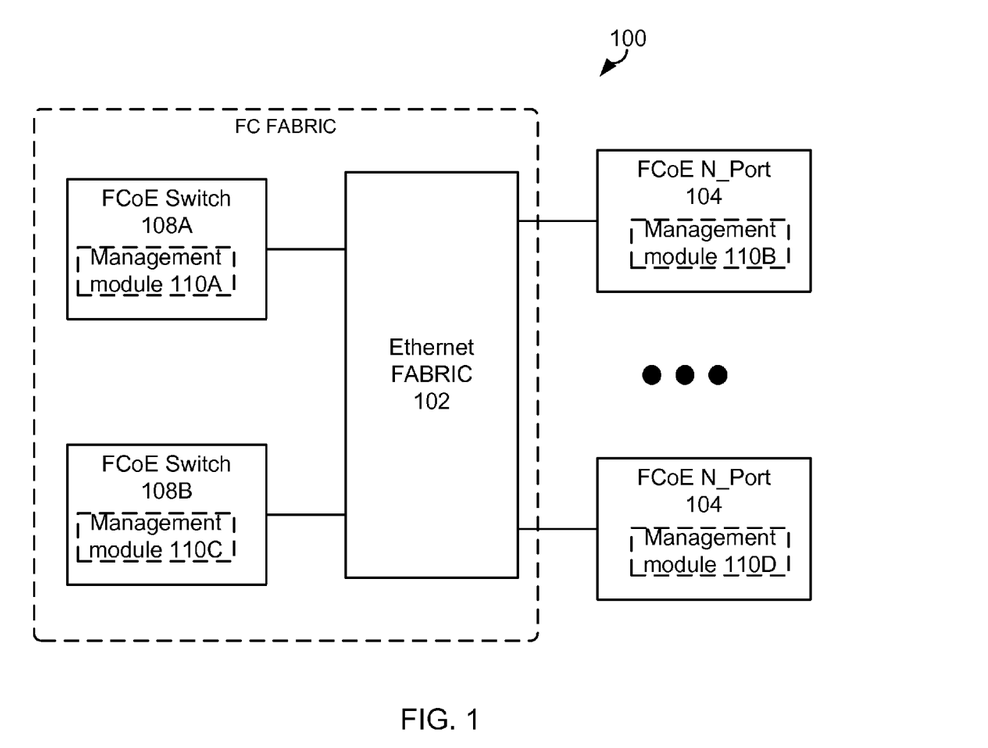
FIG. 1 provides a block diagram of an FCoE arrangement in accordance with embodiments of the present invention.

FIG. 1 provides a block diagram of an FCoE arrangement 100 in accordance with embodiments of the present invention. This architecture includes an FC N_Port(s) 104A and 104B, FCoE switch(s) 108A and 108B, Ethernet fabric 102 and management modules or processors 110A-D. Fabric 102 communicatively couples FCoE switches 108A and 108B and FC N_Ports 104A and 104B. Either the FCoE switches 108A and 108B, the FC N_Port 104A and 104B or both may include a management module or processors 110A-D operable to provide network management services in accordance with embodiments of the present invention. More generally, any FC port may convey connection information to a host in order to facilitate network management services.

Figure 2:
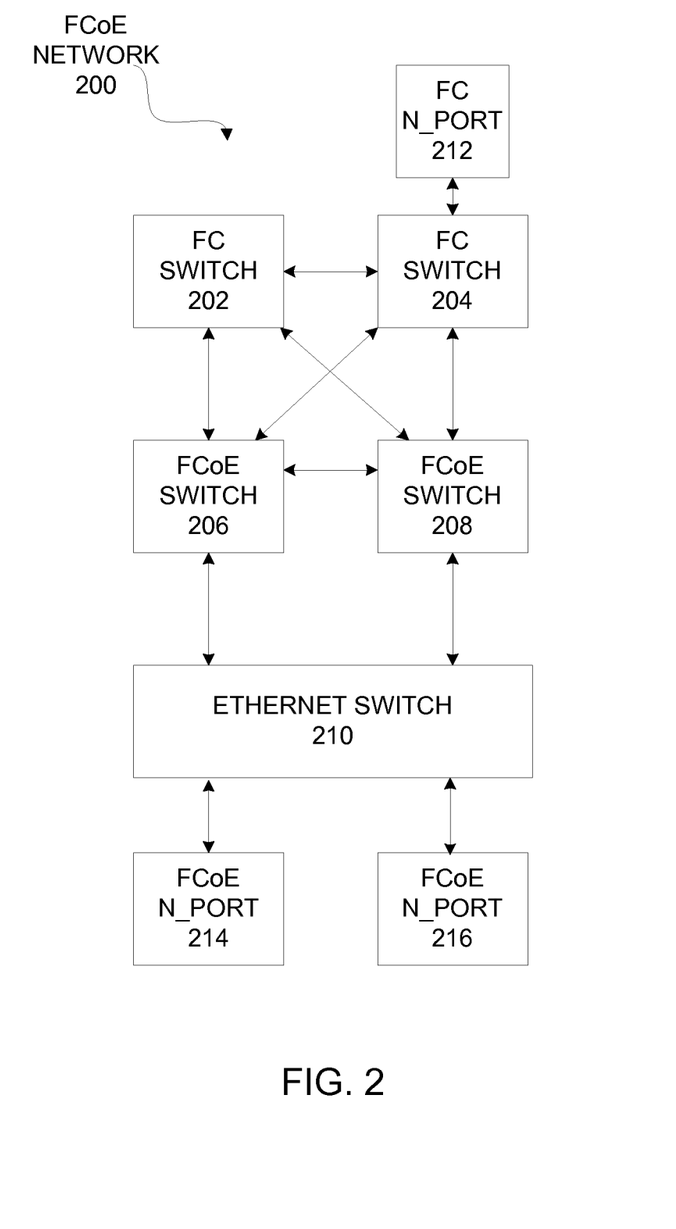
FIG. 2 provides another exemplary illustration of an FCoE network in accordance within an illustrative embodiment of the present invention

FIG. 2 provides another exemplary illustration of an FCoE network in accordance within an illustrative embodiment of the present invention. FCoE network 200 includes FC switch 202, FC switch 204, FCoE switch 206, FCoE switch 208, and Ethernet switch 210. In addition, FCoE network 200 also includes FC N_Port 212, which connects to FC switch 204, and FCoE N_Ports 214 and 216, which connect to Ethernet switch 210. However, it should be noted that illustrative embodiments are not restricted to such. FIG. 2 is only meant as an illustrative example and not as a limitation to the illustrative embodiments. Consequently, the illustrative embodiments may include more or fewer switches, ports, and other various devices as needed by the processes of the illustrative embodiments.

A switch or switches connecting devices in FCoE network 200 is called the 'fabric'. The function of the Ethernet fabric is to receive the Ethernet Frames containing encapsulated Fibre Channel frames from the source port and route the frames to the destination port while continuing to concurrently support TCP/IP traffic as well. Thus, Fibre Channel requirements may be transparent to the Ethernet Fabric. In the fabric topology, N_Ports are connected to an Ethernet switches. An N_Port is a port on a device (e.g., computer, disk drive, etc.) through which the device performs its Fibre Channel communication. An F-Port is a port on a fabric switch to which N_Ports may be directly connected. A communications link between the two ports is represented by the unidirectional fibres transmitting to opposite directions with their associated transmitter and receiver.

FCoE switches 206 and 208 are configured to access a different set of FCoE N_Ports.

Thus, in a Fibre Channel over Ethernet (FCoE) network such as FCoE network 200, an FCoE N_Port may be attached directly to an Ethernet fabric, which in turn provides connectivity to an FCoE switch. However, the presence of the Ethernet fabric and information regarding the configuration of the Ethernet fabric is currently unknown (i.e., transparent) to an FCoE N_Port.

Since a node housing one or more FCoE N_Ports does not know whether an Ethernet fabric is attached to the N_Port or, if an Ethernet fabric is attached to the N_Port, the configuration of the Ethernet fabric, the node cannot perform management services regarding the direct-attached Ethernet fabric, nor can the node perform management services regarding the direct-attached Ethernet fabrics at other FCoE N_Ports. Embodiments of the present invention allow this problem as well as others to be substantially addressed with the FLOGI and PLOGI processes.

Embodiments may provide a new Fibre Channel frame optional header to existing Fibre Channel specifications. This Fibre Channel frame optional header may be defined and sent in all frames. The Fibre Channel optional header is defined as the Ethernet Fabric Header and comprises the configuration information of the Ethernet Fabric attached to the N_Ports in the communications link. This configuration information comprises an indication of whether an Ethernet fabric is present between the FCoE switch and the N_Port, and, if an Ethernet fabric is indicated to be present, a count of the number Ethernet switches in the fabric. In addition, the Fibre Channel optional header may optionally comprise a list of the IP addresses (e.g., IPv4 or IPv6) for each of the Ethernet switches indicated in the count of Ethernet switches. The optional header may also be sent whenever the Ethernet fabric configuration is modified, such as when a new switch is added to the configuration. By providing Ethernet-fabric configuration information in an optional header of the frame, the Ethernet fabric and FCoE N_Ports may provide this information to other FCoE N_Ports. With this information, an FCoE N_Port node can provide more comprehensive management services and fault isolation for the FCoE and Ethernet fabrics.

One possible implementation of the FLOGI/FDISC LS_ACC payload to support direct-attached Ethernet fabric configuration information is shown in TABLE 1.

TABLE 1

FLOGI/FDISC LS_ACC Payload

| Bit Word | 31 ... 24 | 23 ... 16 | 15 ... 08 | 07 ... 00 |
|---|---|---|---|---|
| 0 | ELS_Command code | | | |
| 1 | Common Service Parameters (16 bytes) | | | |
| 4 | | | | |
| 5 | Port_Name | | | |
| 6 | | | | |
| 7 | Node_or Fabric_Name | | | |
| 8 | | | | |
| 9 | Class 1 and Class 6 Service Parameters (16 bytes) | | | |
| 12 | | | | |
| 13 | Class 2 Service Parameters (16 bytes) | | | |
| 16 | | | | |
| 17 | Class 3 Service Parameters (16 bytes) | | | |
| 20 | | | | |
| 21 | Obsolete | | | |
| 24 | | | | |
| 25 | Vendor Version Level (16 bytes) | | | |
| 28 | | | | |
| 29 | SB Services Availability$^a$ (8 bytes) | | | |
| 30 | | | | |
| 31 | Login Extension Data Length* | | | |
| 32 | Reserved | Enet Flags* | Enet Switch count* | |
| 33 | Enet Switch IP Address List Data Length* | | | |
| 34 | Reserved | | | |
| 61 | | | | |
| 62 | Clock Synchronization QoS* (8 bytes) | | | |
| 63 | | | | |
| 64 to n | Enet Switch IP Address List* | | | |
| n to m | Login Extension Data (if any) | | | |

*These fields are only present when the Payload Bit is set to one. When the Payload bit is set to zero these fields are not present in the Payload (i.e. the Payload is 116 bytes long).

Similarly one possible implementation of the PLOGI/PDISC command and LS_ACC payload to exchange information regarding the configuration of a direct-attached Ethernet fabric is shown in TABLE 2.

TABLE 2

PLOGI/PDISC LS_ACC Payload

| Bit Word | 31 ... 24 | 23 ... 16 | 15 ... 08 | 07 ... 00 |
|---|---|---|---|---|
| 0 | ELS_Command code | | | |
| 1 | Common Service Parameters (16 bytes) | | | |
| 4 | | | | |
| 5 | Port_Name | | | |
| 6 | | | | |
| 7 | Node_or Fabric_Name | | | |
| 8 | | | | |
| 9 | Class 1 and Class 6 Service Parameters (16 bytes) | | | |
| 12 | | | | |
| 13 | Class 2 Service Parameters (16 bytes) | | | |
| 16 | | | | |
| 17 | Class 3 Service Parameters (16 bytes) | | | |
| 20 | | | | |
| 21 | Obsolete | | | |
| 24 | | | | |
| 25 | Vendor Version Level (16 bytes) | | | |
| 28 | | | | |
| 29 | SB Services Availability$^a$ (8 bytes) | | | |
| 30 | | | | |
| 31 | Login Extension Data Length* | | | |
| 32 | Reserved | Enet Flags* | Enet Switch count* | |
| 33 | Enet Switch IP Address List Data Length* | | | |
| 34 | Reserved | | | |
| 61 | | | | |
| 62 | Clock Synchronization QoS* (8 bytes) | | | |

TABLE 2-continued

PLOGI/PDISC LS_ACC Payload

| Bit Word | 31...24 | 23...16 | 15...08 | 07...00 |
|---|---|---|---|---|
| 63 | | | | |
| 64 to n | | Enet Switch IP Address List* | | |
| n to m | | Login Extension Data (if any) | | |

*These fields are only present when the Payload Bit is set to one. When the Payload bit is set to zero these fields are not present in the Payload (i.e. the Payload is 116 bytes long).

Figure 3:
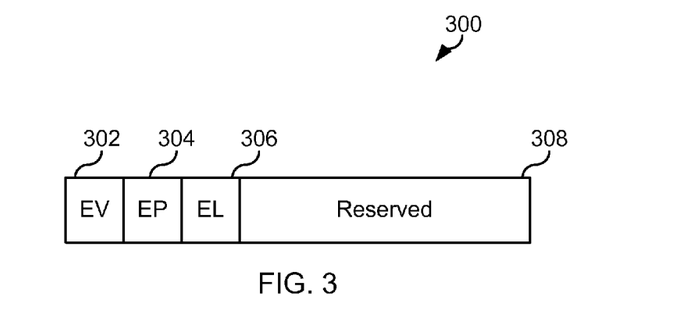
FIG. 3 illustrates the format of the Enet-flag fields in accordance with embodiments of the present invention.

FIG. 3 illustrates the format of the Enet-flag fields provided in accordance with embodiments of the present invention. Byte 2 of word 32 shall contain the Enet-flag field 300. Bits 3-7 shall be reserved. Enet Information Valid (EV) flag 302, bit 0, when set to one, shall indicate that the remainder of information in the Enet-flags field and in the Enet switch count field is valid.

When the EV flag is set to zero, the remainder of the Enet information is not valid. When the EV flag is one, the Enet Present (EP) flag 304, bit 1, when set to one, shall indicate that an Ethernet fabric is attached to the N_Port of FIG. 1 and the Enet-switch-count field specifies the number of Ethernet switches in the fabric. When the EV flag is one, the EP flag 304, bit 1, when set to zero, shall indicate that an Ethernet fabric is not attached to the N_Port. When the EV flag 302 is set to zero, this field is meaningless. When the EP flag 304 indicates that an Ethernet fabric is attached to the N_Port, the Enet List Valid (EL) flag 306, bit 2, when set to one, shall indicate that an IP address for each Ethernet switch in the direct-attached Ethernet fabric is stored in the Enet-switch-IP-address-list field beginning at word 64 of the LS_ACC pay-load. The EL flag 306, when set to zero, shall indicate that IP addresses are not provided for Ethernet switches. When the EP flag 304 indicates that an Ethernet fabric is attached to the N_Port, byte 3 of word 32 shall contain an unsigned, binary integer indicating the number of Ethernet switches in the Ethernet fabric directly attached to the N_Port. When the EP flag 304 is set to zero, this field is meaningless.

When the EL flag 306 is one, word 33 contains an unsigned, binary integer indicating the length of the Enet-switch-IP-address-list field. When the EL flag 306 is set to zero, this field is meaningless.

When the EL flag 306 is one, words 64-n shall contain an entry for each switch in the direct-attached Ethernet fabric and each entry shall contain the IPv4 or IPv6 address for the switch. The addresses are stored contiguously within the list area. The number of entries may be equal to the value in the Enet-switch-count field depending on size constraints.

This information which supports direct-attached Ethernet fabric configuration information may be passed within an optional header of a FC frame. The Data Field Control (DF_CTL) is a one-byte field that specifies the presence of optional headers at the beginning of the Data_Field. Control bit usage in accordance with one embodiment is shown in TABLE 2.

TABLE 2

| Word 3, Bit(s) | Optional Header | Optional Header |
|---|---|---|
| 23 | Reserved | all frames |
| 22 | 0 = Neither ESP_Header nor ESP_Trailer 1 = Both ESP_Header and ESP_Trailer | all frames |
| 21 | 0 = No Network_Header 1 = Network_Header | Device_Data and Video_Data frames |
| 20 | 0 = No Association_Header 1 = Association_Header | Device_Data and Video_Data frames |
| 19-18 | 00b = No Ethernet_Fabric_Header 01b = 8 Byte Ethernet_Fabric_Header 10b = 32 Byte Ethernet_Fabric_Header 11b = 64 Byte Ethernet_Fabric_Header | all frames |
| 17-16 | 00b = No Device_Header 01b = 16 Byte Device_Header 10b = 32 Byte Device_Header 11b = 64 Byte Device_Header | Device_Data and Video_Data frames |

Figure 4:
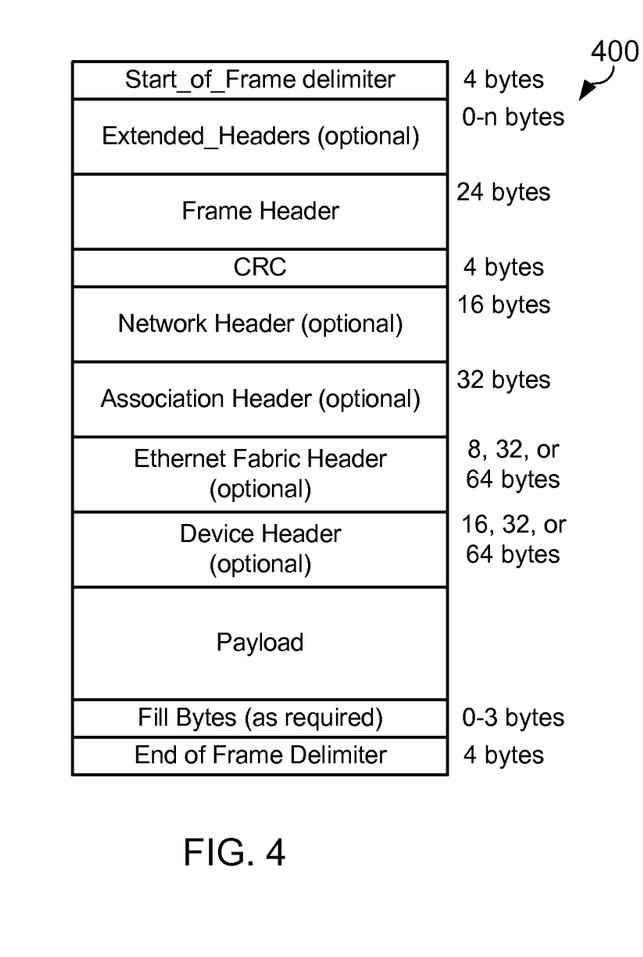
FIG. 4 illustrates the sequential order of the optional headers, Payload, and their sizes in accordance with one embodiment of the present invention.
Figure 5:
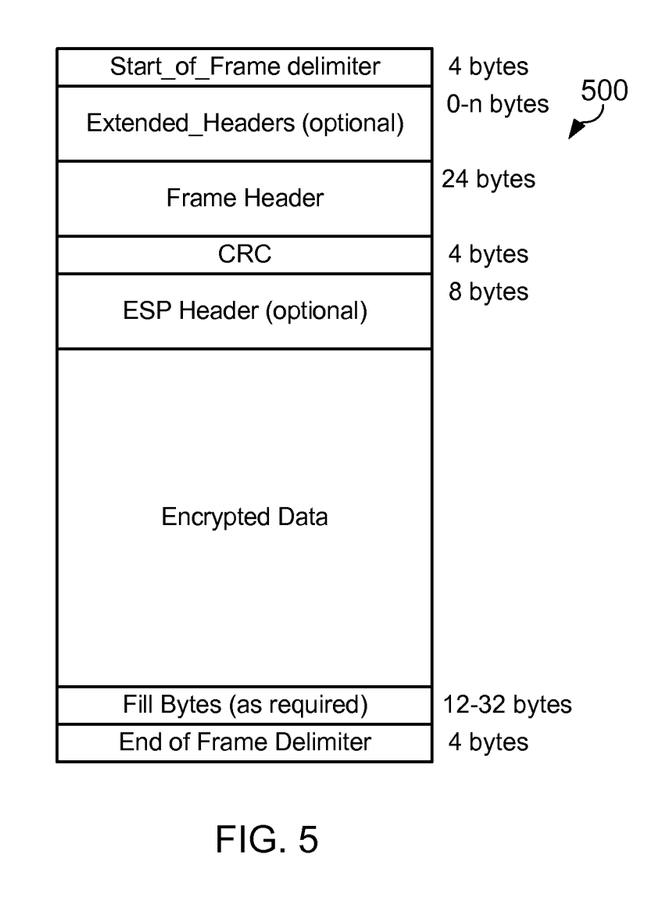
FIG. 5 illustrates the sequential order of the optional headers, Payload, and their sizes in accordance with one embodiment of the present invention.

FIGS. 4 and 5 illustrate the sequential order 400 and 500 respectively of the optional headers, Payload, and their sizes in accordance with one embodiment of the present invention. The Optional Headers shall be positioned in the Data Field in the order specified with the bit 23 header as the first header in the Data Field, bit 22 header as the second header in the Data Field, and so forth, in a left to right manner corresponding to bits 23, 22, 21, and so forth as shown in FIG. 4 and FIG. 5.

If either bit 19 or 18 are set to one, then an Ethernet_Fabric_Header is present. The size of the Ethernet_Fabric_Header is specified by the encoded value of bits 19 and 18 as shown.

If either bit 17 or 16 are set to one, then a Device_Header is present. The size of the Device_Header is specified by the encoded value of bits 17 and 16 as shown.

If an Optional Header is not present as indicated by the appropriate bit in DF_CTL, no space shall be allocated for the Header in the Data Field of the frame (e.g., if bits 23 and 22 are zero and bit 21 is one, the first data byte of the Data Field contains the first byte of the Network_Header).

Optional headers defined within the Data Field of a frame are:
 (1) ESP Header and ESP_Trailer;
 (2) Network_Header;
 (3) Association_Header; and
 (4) Ethernet_Fabric_Header.
 (5) Device Header Control bits in the DF_CTL field of the Frame_Header define the presence of optional headers (see above). The sum of the length in bytes of the Payload, the number of fill bytes, and the lengths in bytes of all optional headers shall not exceed 2,112. The sequential order of the optional headers, Payload, and their sizes in accordance with one embodiment are indicated in FIG. 4 and FIG. 5.

Figure 6:
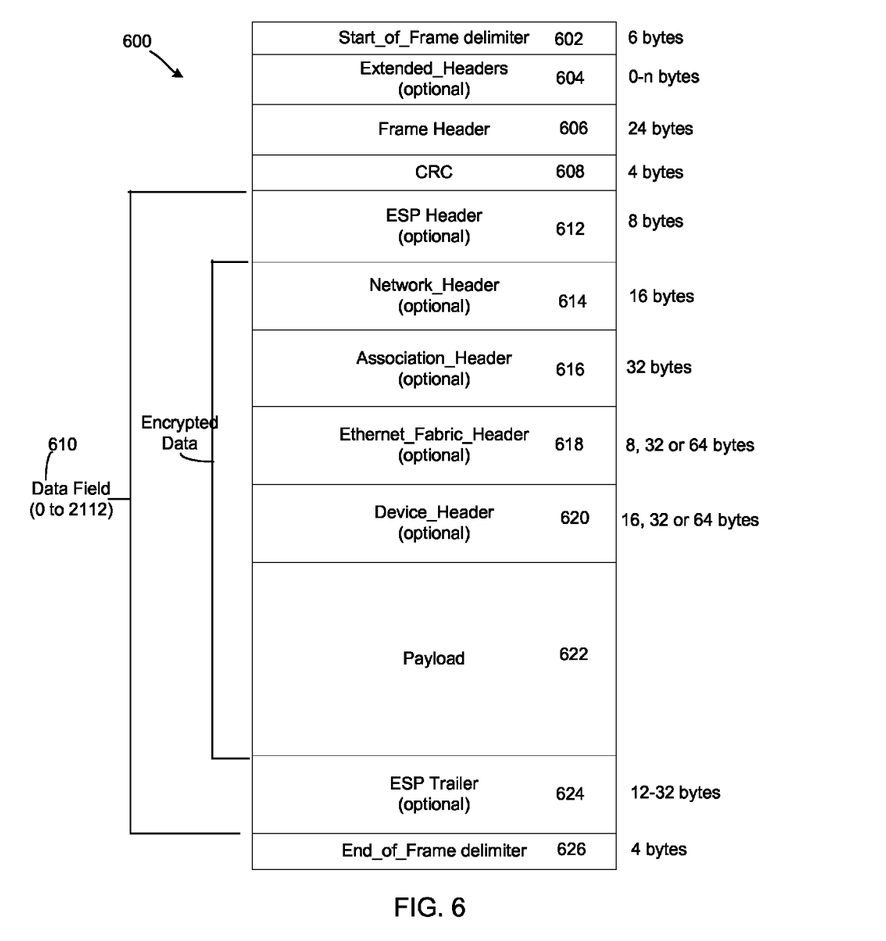
FIG. 6 is an illustration of an exemplary Fibre Channel frame structure in accordance within an illustrative embodiment of the present invention.

FIG. 6 is an illustration of an exemplary Fibre Channel frame structure in accordance within an illustrative embodiment. A frame is a basic unit of communication between two N_Ports. Typical frames are composed of a starting delimiter (SOF), a header, the payload, the Cyclic Redundancy Check (CRC), and an ending delimiter (EOF).

In this illustrative example, Fibre Channel frame 600 includes a Start_Of_Frame (SOF) delimiter and an End_Of- _Frame (EOF) delimiter which are used to indicate where the frame begins and ends. The 4-byte Start_Of_Frame delimiter 602 delimits the beginning of frame 600 and which class of service frame 600 will use. Start_Of_Frame delimiter 602 also indicates whether the frame is the first frame of a new sequence or a subsequent frame in an active sequence.

Fibre Channel frame 600 also includes various optional headers. Extended Headers 604 is an optional header immediately following Start_Of_Frame delimiter 602, and which may contain additional link control information with Frame Header 606. Extended headers 604 may comprise 0-n bytes.

The 24-byte Frame Header 606 contains information about the frame, such as the source and destination identifiers and the routing information. Frame Header 606 also controls link applications and device protocol transfers and detects missing or out of order frames.

The 4-byte Cyclic Redundancy Check (CRC) 608 immediately follows frame header 606. Cyclic Redundancy Check 608 is used to detect transmission errors and verify the data integrity of the Frame Header and the payload.

Data field 610 of Frame 600 comprises the information to be transferred from a source N_Port to a destination N_Port. Data field 610 comprises the payload and various optional headers, including an Encapsulated Security Payload (ESP) Header, a Network Header, an Association Header, an Ethernet Fabric Header, a Device Header, and an Encapsulated Security Payload (ESP) Trailer. The sum of the length in bytes of the Payload, the number of fill bytes, and the lengths in bytes of all optional headers shall not exceed 2112.

Encapsulated Security Payload (ESP) Header 612 is an 8-byte optional header which informs the intended receiver how to properly decrypt and process the encrypted payload data. If an ESP Header 612 is included in the data field, it should be noted that a security key should also be supplied to the destination N_Port to enable the N_Port to decrypt the encrypted data in the data field. Network Header 614 is a 16-byte optional header comprising the source port identifier and the destination port identifier and is used for communication between a Fibre Channel port and a non-Fibre Channel network port, e.g. Ethernet port. Association Header 616 is a 32-byte optional header that is used to identify one or more processes and operations in a node.

Ethernet Fabric Header 618 is an 8-, 32-, or 64-byte optional header provided in the illustrative embodiments to support direct-attached Ethernet fabric configuration information. Ethernet Fabric Header 618 indicates whether an Ethernet fabric is attached to the N_Port.

Ethernet Fabric Header 618 includes a count of the number Ethernet switches in the fabric if an Ethernet fabric is present. Ethernet Fabric Header 618 may also comprise a list of the IP addresses (e.g., IPv4 or IPv6) for each of the Ethernet switches indicated in the count of Ethernet switches.

Device Header 620 is an 8-, 32-, or 64-byte optional header that is entirely defined by t desired FC-4 protocol mapping documents, e.g., SCSI, TCP/IP, or HiPPI. Payload 622 comprises the information to be transferred from the source N_Port to the destination N_Port. The size of Payload 622 is variable based on the presence of the optional headers in data field 610. Optional Encapsulated Security Payload (ESP) Trailer 624 is an 8-byte optional header comprising 12-32 bytes which provide for aligning the payload data to a boundary required by the ESP packet format. The 4-byte End_Of_Frame delimiter 626 indicates the end of frame 600. End_Of_Frame delimiter 626 also indicates whether the Frame is valid or invalid.

Referring back to Table 3, Data Field Control is a one-byte field within the frame header, such as Frame Header 606 in FIG. 6. The Data Field Control specifies the presence of optional headers at the beginning of Data Field 610 in FIG. 6. In other words, the Data Field Control bit in the Frame Header indicates which optional headers may be found in the Data Field. For instance, the optional headers that may be defined within the Data Field include ESP Header 612 and ESP Trailer 624, Network Header 614, the Association-Header 616, Ethernet Fabric Header 618, and Device-Header 620 in FIG. 6. The optional headers are positioned in the Data Field in the following order: the header corresponding to control bit 23 is the first header in the Data Field, the header corresponding to control bit 22 is the second header in the Data Field, the header corresponding to control bit 21 is the third header in the Data Field, and so forth.

As shown, control bit 23 is reserved. For control bit 22, a value of 0 indicates that neither an ESP Header nor ESP Trailer is present in the Data Field, while a value of 1 indicates that both an ESP Header and ESP Trailer are present. For control bit 21, a value of 0 indicates that no Network Header is present in the Data Field, while a value of 1 indicates that a Network Header is present. For control bit 20, a value of 0 indicates that no Association Header is present in the Data Field, while a value of 1 indicates that an Association Header is present. For control bits 17 and 16, if both control bits are set to 0, no Device Header is present in the Data Field. However, if either control bit 17 or 16 is set to 1, then a Device Header is present in the Data Field. The size of the Device Header is specified by the encoded value of control bits 17 and 16. For instance, if control bits 17 and 16 are 01b, the size of the Device Header is 8 bytes. If control bits 17 and 16 are 10b, the size of the Device Header is 32 bytes. If control bits 17 and 16 are 11b, the size of the Device Header is 64 bytes.

Control bits 19-18 are used to indicate the presence of the Ethernet Fabric Header in the Data Field. As previously mentioned, the illustrative embodiments use this Ethernet Fabric Header to enable configuration information about the Ethernet fabric to be communicated between N_Ports through the Fibre Channel frames. If the control bits 19 and 18 are set to 0, no Ethernet Fabric Header is present in the Data Field. However, if either control bit 19 or 18 is set to 1, then an Ethernet Fabric Header is present in the Data Field. The size of the Ethernet Fabric Header in the Data Field is specified by the encoded value of control bits 19 and 18. For instance, if control bits 19 and 18 are 01b, the size of the Ethernet Fabric Header is 8 bytes. If control bits 19 and 18 are 10b, the size of the Ethernet Fabric Header is 32 bytes. If control bits 19 and 18 are 11b, the size of the Ethernet Fabric Header is 64 bytes. An Ethernet Fabric Header may be sent in all Fibre Channel frames.

If an optional header is not present as indicated by the appropriate bit in the Data Field Control, no space is allocated for the header in Data Field 610 of frame 600 in FIG. 6. For example, if control bits 23 and 22 are 0 and control bit 21 is 1, the first data byte of Data Field 610 will contain the first byte of optional Network Header 614.

Figure 7:
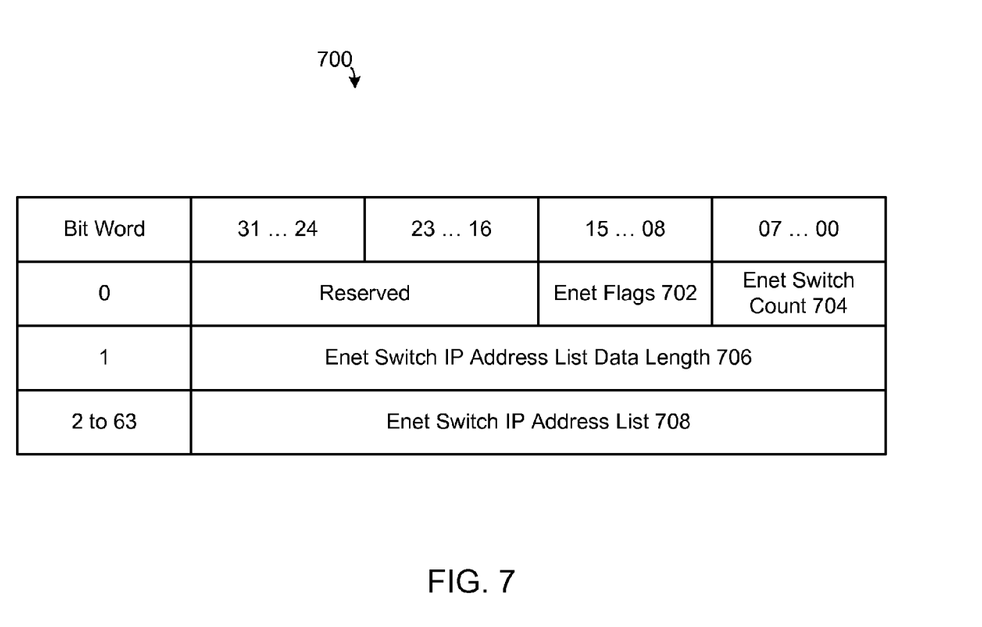
FIG. 7 is an exemplary illustration of an Ethernet Fabric Header format in accordance within an illustrative embodiment.

FIG. 7 is an exemplary illustration of an Ethernet Fabric Header format in accordance within an illustrative embodiment. Ethernet Fabric Header 700 comprises Enet flag field 702, Enet Switch Count field 704, Enet Switch IP Address List Data Length field 706, and Enet Switch IP Address List field 708.

Byte 2 of word 0 contains Enet flag field 702. The format of Enet flag field 702 is shown in detail with reference to FIG. 3. Enet flag field 300 comprises an Enet information valid (EV) flag (bit 0) 302, an Enet Present (EP) flag (bit 1) 304, and an Enet List Valid (EL) flag (bit 2 306. Bits 3-7 of Enet flag field 300 are reserved. EV flag 302 indicates whether or not the remainder of information in the Enet flag field and in the Enet Switch Count field is valid. When EV flag 302 is set to 0, the remainder of the Enet information is not valid.

Enet Present (EP) flag (bit 1) 304 indicates the presence of an Ethernet fabric. When the EV flag 302 is set to 1, EP flag 304, when set to 1, indicates that an Ethernet fabric is attached to the N_Port and the Enet Switch Count field specifies the number of Ethernet switches in the fabric. When EV flag 302 is set to 1, EP flag 304, when set to 0, indicates that an Ethernet fabric is not attached to the N_Port. When EV flag 302 is set to 0, EP flag field 304 is meaningless.

Enet List Valid (EL) flag (bit 2) 306 indicates whether or not an IP address is present for the Ethernet switches in the Switch Count. When EP flag 304 indicates that an Ethernet fabric is attached to the N_Port, the EL flag 306, when set to 1, indicates that an IP address for each Ethernet switch in the direct-attached Ethernet fabric is stored in the Enet Switch IP Address List field beginning at word 64 of the Link Service (LS)-Accept (ACC) payload. EL flag 306, when set to 0, indicates that IP addresses are not provided for the Ethernet switches.

Byte 3 of word 0 of Ethernet Fabric Header 700 contains Enet Switch Count field 704.

Enet Switch Count field 704 comprises an unsigned, binary integer indicating the number of Ethernet switches in the Ethernet fabric directly attached to the N_Port when EP flag 304 indicates that an Ethernet fabric is attached to the N_Port. When EP flag 304 is set to 0, Enet Switch Count field 704 is meaningless.

Word 1 of Ethernet Fabric Header 700 contains Enet Switch IP Address List Data Length field 706. Enet Switch IP Address List Data Length field 706 comprises an unsigned, binary integer indicating the length of the Enet Switch IP Address List field when EL flag 306 in FIG. 3 is set to 1. However, if EL flag 306 is set to 0, Enet Switch IP Address List Data Length field 706 is meaningless.

Words 2-63 of the Ethernet Fabric Header contain Enet Switch IP Address List 708. Enet Switch IP Address List 708 comprises an entry for each switch in the direct-attached Ethernet fabric and each entry contains the IPv4 or IPv6 address for the switch when EL flag 306 in FIG. 3 is set to 1. The IP addresses are stored contiguously within the list area. The number of entries may be equal to the value in Enet Switch Count field 704. The header may be limited in some embodiments to 64 bytes.

Figure 8A:
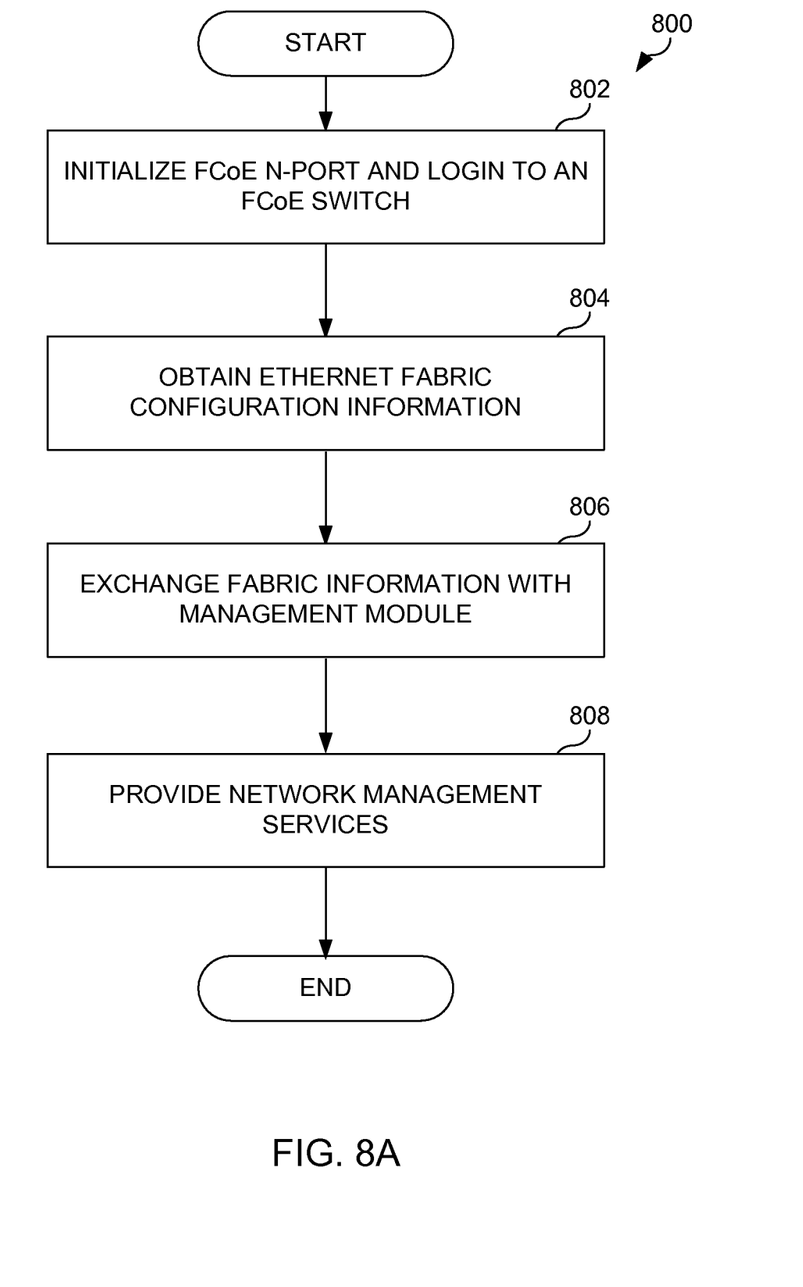
FIG. 8A provides a logic flow diagram wherein network management services are provided in accordance with embodiments of the present invention.

FIG. 8A provides a logic flow diagram wherein network management services are provided based on the use of a FLOGI process in accordance with embodiments of the present invention. Operations 800 begin with step 802. In step 802 an FCoE N_Port is initialized. This initialization process (FLOGI) may involve connecting or communicatively coupling the FCoE N_Port to an FCoE switch and logging into the fabric. In step 804 the FCoE N_Port obtains the configuration information associated with the Ethernet fabric. This information may then be provided to a management module or processor in step 806. The FCoE N_Port may then communicate to one or more other N_Ports. This communication begins with the PLOGI process. During the PLOGI process one N_Port may convey Ethernet Fabric configuration information. During FLOGI one N_Port logins to the fabric via an FCoE Switch. During PLOGI one N_Port may login to one or more other N_Ports.

A management module or processor in step 806 will exchange information associated with the Ethernet fabric and at least one other FCoE N_Port or FCoE switch. The management module or processor may then provide network management services in Step 808 based on the information associated with the Ethernet fabric. The information that is provided may be done so in a login as discussed above. The information may include an indication of Ethernet fabric presence between the FCoE switch and FCoE N_Port, a count of a number of FCoE switches in the FCoE fabric, a list of IP addresses for each FCoE switch, and a configuration of the Ethernet fabric attached to the FCoE N_Port. The management services may include limited the number of switches coupled to the Ethernet fabric at the FCoE N_Port. This may involve aborting the initialization or login process based on performance or reliability requirements.

Figure 8B:
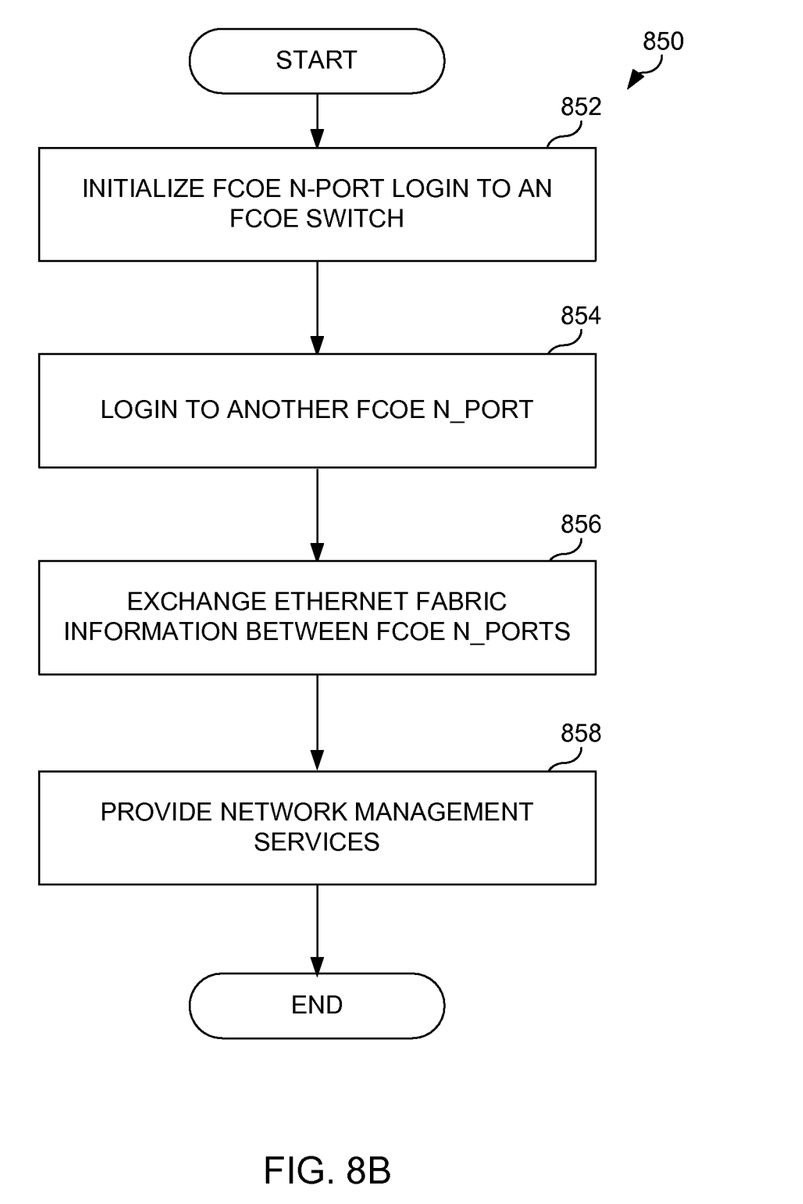
FIG. 8B provides a logic flow diagram wherein network management services are provided in accordance with embodiments of the present invention.

FIG. 8B provides a logic flow diagram wherein network management services are provided based on the use of a PLOGI process in accordance with embodiments of the present invention. Operations 850 begin with step 852. Following FLOGI, in step 852 an FCoE N_Port may login to another FCoE N_Port in step 854. This initialization may involve connecting or communicatively coupling to another FCoE N_Port and logging in. In step 856 the FCoE N_Ports exchange configuration information associated with the Ethernet fabric. A management module or processor will receive information associated with the Ethernet fabric and at least one other FCoE N_Port or FCoE switch. The management module or processor may then provide network management services in Step 858 based on the information associated with the Ethernet fabric. The information that is provided may be done so in a login as discussed above. The information and services may be similar to those discussed with reference to FIG. 8A.

Embodiments of the present invention may be employed within a storage area network (SAN) environment that employs fibre channel (FC) technology. A SAN environment may be based around a local area network (LAN) interconnection, wide area network (WAN), virtual private network (VPN), a combination of LAN, WAN and VPN implementations, or more broadly any acceptable networking architecture. The networking architecture interconnects various clients based upon personal computers, servers, and gateways to an external network such as the Internet.

Figure 9:
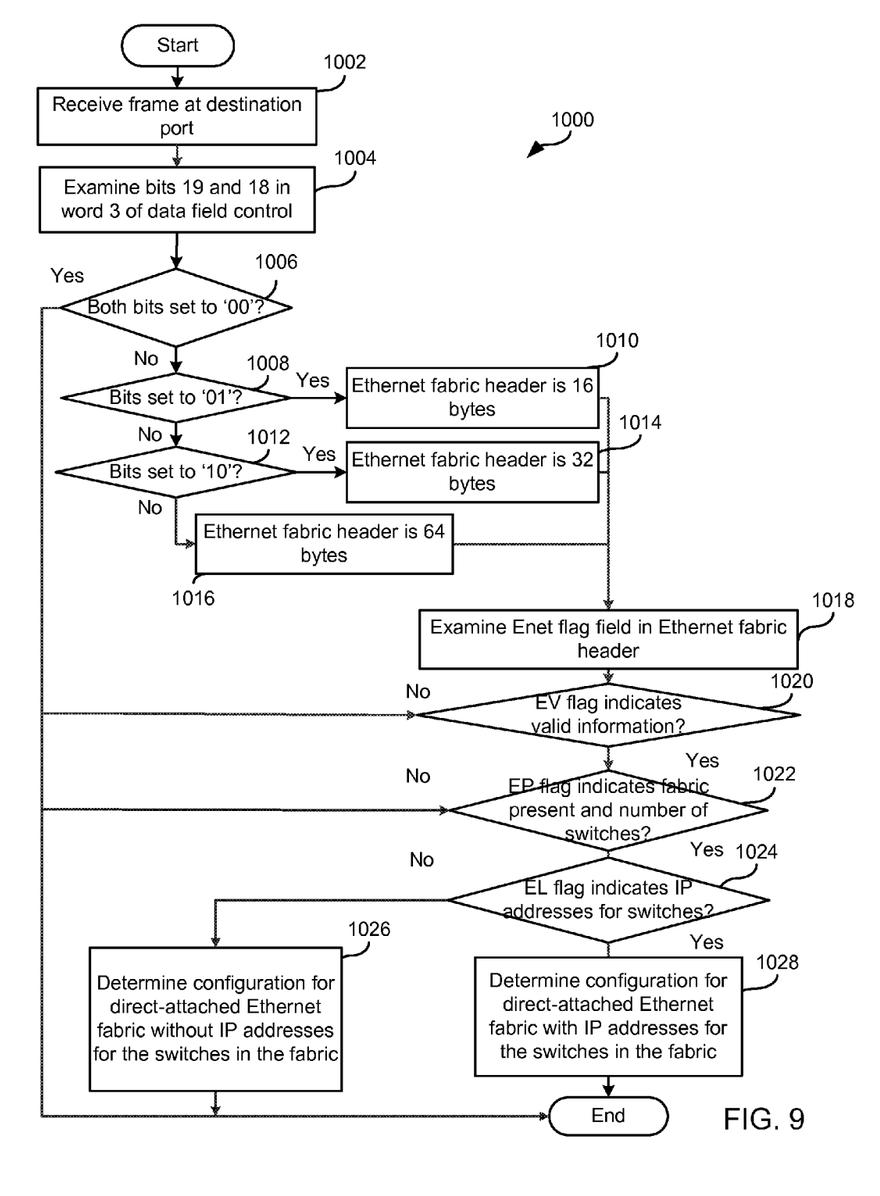
FIG. 9 is a flowchart of a process for using an optional header in the data field of a Fibre Channel frame to support direct-attached Ethernet fabric configuration information in accordance within an illustrative embodiment of the present invention.

FIG. 9 is a flowchart of a process for using an optional header in the data field of a Fibre Channel frame to support direct-attached Ethernet fabric configuration information in accordance within an illustrative embodiment. The process begins when a frame is received at a destination port (step 902). The destination port may be an N_Port in FCoE network 200 in FIG. 2. Upon receipt of the frame, the process examines the Data Field Control bits within Frame Header 606 in FIG. 6 to determine if an Ethernet Fabric Header is present in Data Field 610 (step 904). A determination is made as to whether bits 19 and 18 in word 3 within the Data Field Control are both set to '00' (step 906). If so ('yes' output of step 906), there is no Ethernet Fabric Header present in the Data Field, and the process terminates thereafter.

If bits 19 and 18 in word 3 within the Data Field Control are not both set to '00' ('no' output of step 906), a determination is made as to whether the bits are set to '01' (step 908). If so ('yes' output of step 908), the process determines that an 8-byte Ethernet Fabric Header is present in the Data Field (step 910). If the bits are not set to '01' ('no' output of step 908), a determination is made as to whether the bits are set to '10' (step 912). If so ('yes' output of step 912), the process determines that a 32-byte Ethernet Fabric Header is present in the Data Field (step 914). If the bits are not set to '10' ('no' output of step 912), the process determines that a 64-byte Ethernet Fabric Header is present in the Data Field (step 916).

The process then examines the Enet flag field 702 in FIG. 7 of the Ethernet fabric header present within the Data Field section of the frame (step 918). A determination is made as to whether the EV flag field indicates the remainder of information in the Enet flag field and the Enet Switch Count field 604 in FIG. 7 is valid (i.e., EV flag set to '1') (step 920). If the information is not valid, the process terminates thereafter. If EV flag field 302 in FIG. 3 indicates the remainder of information is valid, the process then determines whether EP flag field 304 indicates that an Ethernet fabric is attached to the N_Port and the Enet Switch Count specifies the number of Ethernet switches in the fabric (step 922). If an Ethernet fabric is not attached, the process terminates thereafter. If the EP flag field indicates an Ethernet fabric is attached to the N_Port and the Enet Switch Count specifies the number of Ethernet switches in the fabric, the process uses EL flag field 306 in FIG. 3 to determine if an IP address for each Ethernet switch in the direct-attached fabric is stored in the Enet Switch IP Address List beginning at word 64 of the LS ACC payload (step 924). If no IP addresses are stored, the process determines a configuration of the direct-attached Ethernet fabric without the IP addresses of the switches in the direct-attached fabric (step 926). However, if the EL flag field indicates than an IP address for each Ethernet switch, the process determines a configuration of the direct-attached Ethernet fabric that includes the IP addresses of the switches in the direct-attached fabric (step 928).

The flowchart and block diagrams in the FIGs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus.

The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In summary, embodiments of the present invention provide a FC over Ethernet (FCoE) device having knowledge of the configuration of an attached Ethernet fabric and operable to provide network management services to attached FCoE devices. Embodiments include a management module or processor within an FCoE N_Port. The management module or processor receives information associated with an Ethernet fabric from the FCoE N_Port and provides management services based on the information associated with the Ethernet fabric. The FCoE N_Port communicatively couples to at least one additional FCoE N_Port through the Ethernet fabric. The FCoE N_Ports may be implemented within a disc storage drive, a host bus adapter, and/or an FCoE switch. The information may be provided when the FCoE N_Port is initialized or logs into the Ethernet fabric. The information provided may include an indication of whether or not an Ethernet fabric is present between the FCoE N_Ports, a count of a number of FCoE N_Ports in the fabric when the fabric is present, a list of IP addresses associated with each FCoE N_Port and a configuration of the Ethernet fabrics attached to the FCoE N_Ports.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship.

For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system, comprising:
   at least one Fibre Channel over Ethernet (FCoE) N_Port;
   an Ethernet fabric; and
   an FCoE switch, said at least one FCoE N_Ports communicatively coupled to said FCoE switch through said Ethernet fabric; and
   a processing device coupled to said at least FCOE N_Port operable to determine information associated with said Ethernet fabric, and exchange said information associated with said Ethernet fabric to at least one additional FCoE N_Port
   wherein said information associated with said Ethernet fabric comprises:
   an indication of whether an Ethernet fabric is present between said FCoE switch and said FCoE N_Port;
   a count of a number Ethernet switches in said FCoE fabric when said Ethernet fabric is present;
   a list of IP addresses for each of Ethernet switches; and
   a configuration of said Ethernet fabrics attached to said at least one FCoE N_Port.

2. The system of claim 1, wherein said at least one FCoE N_Ports is further operable to provide network management services based on said information associated with said Ethernet fabric.

3. The system of claim 1, wherein said at least one FCoE $N_{13}$Ports is further operable to provide fault isolation services based on said information associated with said Ethernet fabric.

4. The system of claim 1, further comprising a management module or processor operable to provide said network management services.

5. The system of claim 1, wherein said network management services comprise:
   limiting a number of Ethernet switches attached to an FCoE N_Port.

6. The system of claim 1, wherein said information associated with said Ethernet fabric is provided at an FCoE N_Port initialization process.

7. The system of claim 1, wherein said FCoE N_Port is implemented in at least one device selected from said group consisting of:
   a disk storage device;
   a host bus adapter (HBA); and
   an FCoE switch.

8. A method, comprising:
   initializing at least one Fibre Channel over Ethernet (FCoE) N_Port;
   coupling said at least one Fibre Channel over Ethernet (FCoE) N_Port to an Ethernet fabric;
   determining information associated with said Ethernet fabric;
   coupling an FCoE switch to said at least one FCoE N_Port through said Ethernet fabric;
   exchanging said information associated with said Ethernet fabric between at least one FCoE N_Port and said FCoE switch; and
   providing network management services based on said information associated with said Ethernet fabric
   wherein said information associated with said Ethernet fabric comprises:
   an indication of whether an Ethernet fabric is present between said FCoE switch and said FCoE N_Port;
   a count of a number Ethernet switches in said FCoE fabric when said Ethernet fabric is present;
   a list of IP addresses for each of Ethernet switches; and
   a configuration of said Ethernet fabrics attached to said at least one FCoE N_Port.

9. The method of claim 8, further comprising providing fault isolation services based on said information associated with said Ethernet fabric.

10. The method of claim 8, wherein a management module or processor to provides said network management services.

11. The method of claim 8, wherein said network management services comprise:
    limiting a number of Ethernet switches attached to an FCoE N_Port.

12. The method of claim 8, wherein said information associated with said Ethernet fabric is provided at an FCoE N_Port initialization process.

13. A system, comprising:
    a first Fibre Channel over Ethernet (FCoE) N_Port;
    an Ethernet fabric; and
    at least one additional FCoE N_Port, said first FCoE N Port communicatively couples to said at least one additional FCoE N_Port through said Ethernet fabric;
    a processing device coupled to said first FCoE N_Port and/or said at least one additional FCoE N_Port, said FCoE N_Ports operable to determine information associated with said Ethernet fabric, and exchange said information associated with said Ethernet fabric with said processing device, said processing device operable to provide network management services based on said information associated with said Ethernet fabric
    wherein said information associated with said Ethernet fabric is communicated between said first FCoE N_Port and said at least one additional FCoE N_Port via a port login (PLOGI) process, the information comprises:
    an indication of whether an Ethernet fabric presence between said first FCoE N_Port and said at least one additional FCoE N_Port;
    a count of a number Ethernet Switches in said Ethernet fabric when said Ethernet fabric is present; and
    a list of IP addresses for each of Ethernet Switch;
    a presence of said Ethernet fabrics attached to said FCoE N_Ports; and
    a configuration of said Ethernet switches in said Ethernet fabric attached to said FCoE N_Ports.

14. The system of claim 13, wherein said management module or processor is further operable to provide fault isolation services based on said information associated with said Ethernet fabric.

15. The system of claim 13, wherein said network management services comprise:
    limiting a number of FCoE switches coupled to said Ethernet fabric at an FCoE N_Port.

16. The system of claim 13, wherein said FCoE N_Ports are implemented in at least one device selected from said group consisting of:
    a disk storage device;
    a host bus adapter (HBA); and
    an FCoE switch.

17. A system, comprising:
    a processing device within a Fibre Channel over Ethernet (FCoE) N_Port, said processing device operable to:
        receive information associated with an Ethernet fabric from a FCoE N_Port; and
        provide network management services based on said information associated with said Ethernet fabric;
    said FCoE N_Port operable to communicatively couple to at least one additional FCoE N_Port through said Ethernet fabric;
    said information associated with said Ethernet fabric is communicated between said first FCoE N_Port and said at least one additional FCoE N_Port via a port login (PLOGI) process, the information comprises:
        an indication of whether an Ethernet fabric presence between said first FCoE N_Port and said at least one additional FCoE N_Port;
        a count of a number Ethernet Switches in said Ethernet fabric when said Ethernet fabric is present; and
        a list of IP addresses for each of Ethernet Switch; and
        a configuration of said Ethernet switches in said Ethernet fabric attached to said FCoE N_Ports; and
    said FCoE N_Ports are implemented in at least one device selected from said group consisting of:
        a disk storage device;
        a host bus adapter (HBA); and
    an FCoE switch.

* * * * *